Oct. 21, 1969

S. DAVIS 3,474,312

INCREASED TORQUE CAPACITY SYNCHRO APPARATUS

Filed June 5, 1968

INVENTOR.
Sidney Davis

BY Edward H Loveman

ATTORNEY

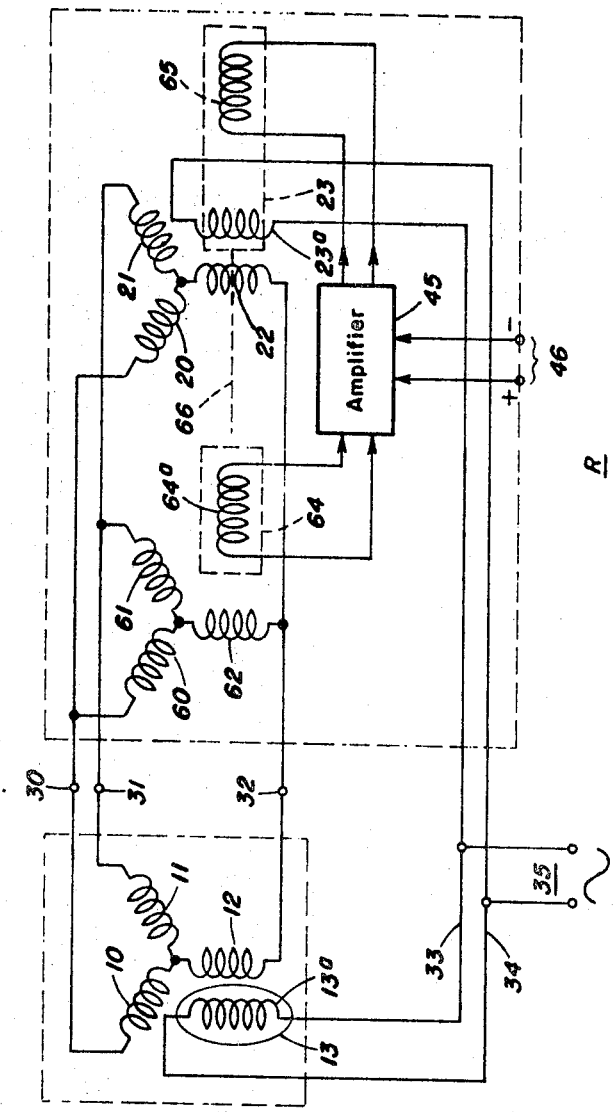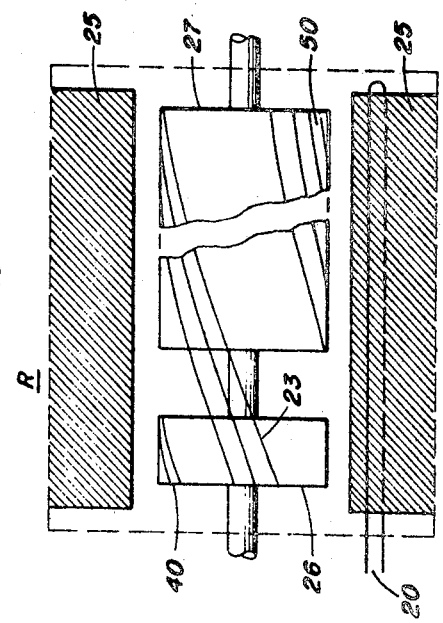
Fig. 3.
Fig. 2.
INVENTOR.
Sidney Davis
ATTORNEY

United States Patent Office 3,474,312
Patented Oct. 21, 1969

3,474,312
INCREASED TORQUE CAPACITY SYNCHRO APPARATUS
Sidney Davis, East Norwich, N.Y., assignor to Vernitron Corporation, New York, N.Y.
Filed June 5, 1968, Ser. No. 734,704
Int. Cl. H02p *1/54, 5/46, 7/68*
U.S. Cl. 318—18                                                6 Claims

ABSTRACT OF THE DISCLOSURE

The invention is concerned with an improved synchro wherein a quadrature current in the synchro stator is detected, amplified, and transformed by a quadrature winding on the synchro rotor to the synchro stator thereby vastly increasing the torque capacity of the synchro.

---

Figure 1:
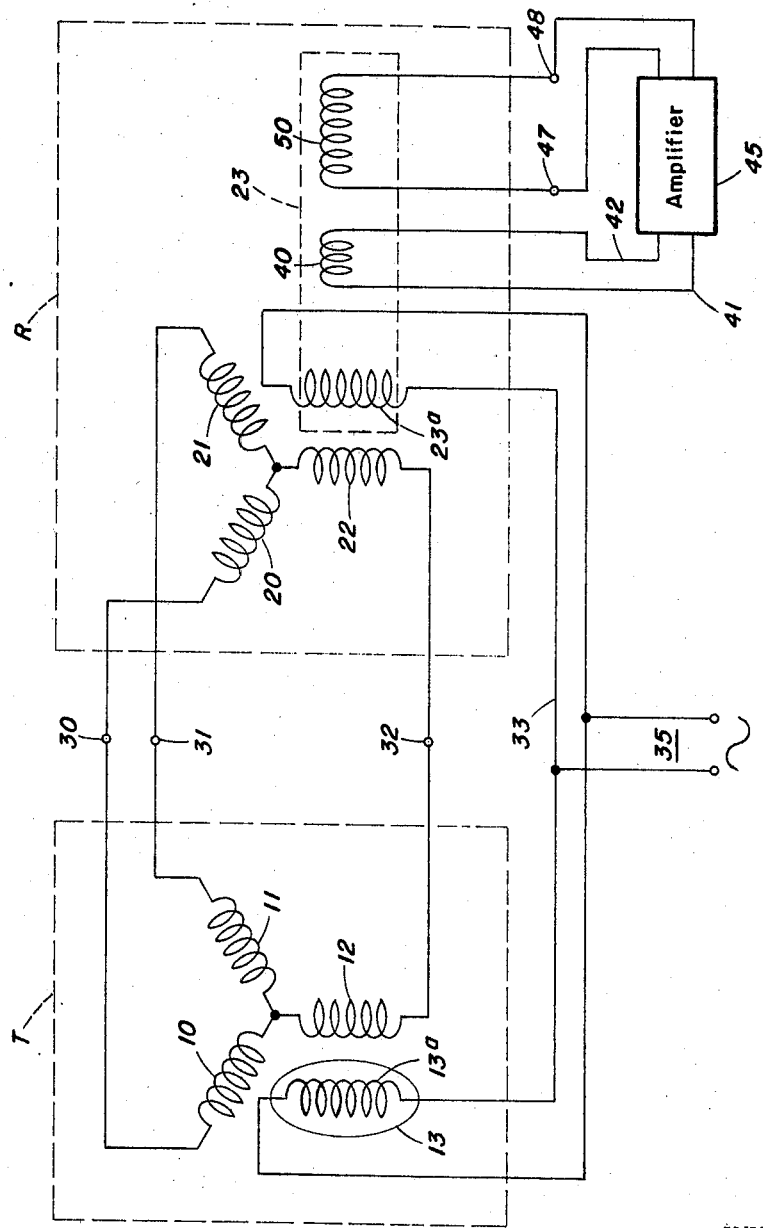

The present invention relates to a synchro, and more particularly to an improved synchro in which the torque gradient of the synchro is vastly increased.

As well known in the art, a common form of remote torque transmission system may be comprised of a torque transmitter and a torque receiver wherein a Y-connected winding of the transmitter stator is electrically connected to a corresponding Y-connected winding of the receiver stator and the receiver and transmitter each have wound rotors which are excited from an A-C reference source. If both rotors are in the same magnetic or electrical position, the same voltages are induced in each stator, and no current flows in the stators. Should the rotor position of one, i.e., the torque transmitter, be slightly different from the rotor position of the torque receiver, then the voltage induced in the receiver stator by its rotor is not the same as the voltage induced in the transmitter stator by its rotor, causing an unbalance so that current will flow in the stators. This current flows in a magnetic axis essentially perpendicular to the rotor excitation axis, and is commonly known as quadrature current or cross field current, whereas the current of the rotor is called the direct field current. As is well known in this type of system, the torque capacity of the torque receiver is approximately proportional to the product of the flux density of the rotor field multiplied by the quadrature current of the stator, multiplied by the cosine of the time phase angle between the direct and quadrature currents. It is obvious, that for a fixed rotor field flux density and a time phase angle of essentially zero degrees (cos $\theta = 1$) approximately, the torque per degree of misalignment between transmitter and receiver is proportional to the quadrature current per degree of misalignment.

It has been the practice for manufacturers of good quality torque receivers to increase the torque per degree of misalignment, or torque gradient of their units by reducing the impedance in the quadrature axis by placing a short-circuited quadrature axis coil, which may consist of copper bars short-circuited together on the rotor at 90 electrical degrees to the energizing winding. This method increases the quadrature axis current of the stator, which thereby increases the torque gradient typically by 50 to 60%. This increase, however, is often insufficient to enable the torque receiver to drive a useful load, and it has frequently been the practice to use an instrument servomechanism to drive the load, rather than use a simple inexpensive torque receiver. Hence, it would be extremely desirable if the torque capacity of torque receivers could be increased to minimize the need for a servomechanism.

In accordance with the present invention, the torque receiver, in addition to its normal rotor and stator, includes a sensing coil on the quadrature axis of the rotor for detecting the quadrature axis stator current, an amplifier for amplifying this current and a quadrature axis coil for transforming the amplified quadrature axis current to the stator whereby the torque capacity of the synchro is vastly increased.

Various means may be employed to sense the quadrature axis field. For example, a separate synchro control transformer may be used as a sensor of the quadrature axis field by electrically coupling the control transformer stator to the stator of the torque transmitter and receiver and mechanically coupling the control transformer rotor to the rotor of the receiver. If now the control transformer rotor coil is aligned with the quadrature axis of the torque receiver, the control transformer rotor coil will sense the quadrature axis field. The transformer rotor coil output is amplified to drive a quadrature axis coil on the torque receiver thereby increasing the receiver quadrature axis stator current and hence, increase the torque gradient.

Accordingly, it is a primary object of the present invention to provide a synchro in which the torque output gradient is substantially increased.

It is another object of the present invention to provide a remote torque transmission system comprised of only a torque receiver and a torque transmitter and capable of driving heavier loads than conventional systems.

It is yet another object of the present invention to provide a torque transmission system utilizing a minimum of parts.

These and other objects and many of the attendant advantages of this invention will be readily appreciated as the same becomes better understood by reference to the following detailed description when considered in connection with the accompanying drawings, wherein FIG. 1 is a schematic circuit diagram of a torque transmission system in accordance with the present invention;

FIG. 2 is a schematic form of a synchro receiver in accordance with the present invention; and FIG. 3 is another embodiment of a torque transmission system.

Referring now to the drawings, wherein like reference numerals designate like parts throughout the figures thereof, there is shown in FIG. 1 a basic synchro torque transmission system which includes a torque transmitter T and a torque receiver R. The torque transmitter contains a stator, shown as wound with three-phase coils 10, 11, 12, and a rotor 13 having a coil 13a. The torque receiver has a similar stator with coils 20, 21, 22, and a rotor 23 with a rotor coil 23a. Transmitter and receiver stators are connected as schematically indicated by terminals 30, 31, 32. The rotor coils 13a and 23a are connected by lines 33, 34, and supplied from a source of alternating current potential 35.

A review of the operation of the torque transmission system will make the present invention clear.

Let it be assumed that the rotors 13 and 23 of the transmitter, and receiver, respectively are in identical angular position with respect to the stator coils 10, 11, 12 and 20, 21, 22. The voltages induced in the stator coils of both the transmitter, and the receiver will be identical and there will be no net magnetomotive force in either the transmitter or the receiver stators, and the entire system will be at rest. If rotors 13 and 23 are slightly misaligned, a voltage will be induced in the stator coils of the transmitter which will be different from that induced in the receiver coils. A net current will flow in the stators which will set up a magnetomotive force in the quadrature axis of the receiver stator, also referred to as a cross field magnetomotive force. This quadrature field, acting with the direct field of the rotor coil 23 forms a torque in the receiver, tending to move the rotor 23 and its coil 23a toward angular correspondence with rotor 13.

The torque developed by rotor 23 is proportional to the product of the flux density of the direct field (caused by the current within coil 23a), and the current in the stator cross field. This equality assumes that the currents in the direct field and in the quadrature field are in the same time phase. Any out-of-phase conditions further reduce the available torque by the cosine of the phase angle between the direct and the cross field magnetomotive forces.

Mathematically, the relationship will be $$T = K \times I_{dr} \times \cos \theta \times I_{qs} \qquad (1)$$

where T=torque; K a constant of proportionality; $I_{dr}$ the rotor direct axis magnetomotive force; $I_{qs}$ the stator quadrature axis magnetomotive force; and $\theta$ time phase angle between $I_{dr}$ and $I_{qs}$.

It can immediately be seen that increase of the torque depends on increasing the respective currents and making $\theta_q$ as small as possible, preferably 0°, i.e., cos $\theta$=1.

The magnetomotive force caused by the direct axis rotor current is limited by the impedance of the entire system, as well as by the saturation of the iron material. Thus as mentioned previously, attempts have been made to increase the torque of synchros, in order to avoid the cost and complexity of servo-mechanisms. By passively lowering the impedance of the coils, and improving the magnetomotive flux, for example, by use of salient pole rotors and/or having a variable air gap, a modest improvement in performance has been obtained.

The current in the stator quadrature axis can, however, be increased by increasing the current in the rotor quadrature axis. This increase in current is limited only by heating of the electrical conductors, and iron saturation. In accordance with the present invention, an active element introducing a negative impedance, i.e., an amplifier which can, additionally, be controlled as to gain and phase, is utilized to provide for positive amplification of the current in the stator quadrature axis.

Thus the present invention contemplates sensing the quadrature axis magnetomotive force in the receiver, amplifying this signal by an amplifier, and transforming the amplified signal to the receiver stator by means of a quadrature axis coil on the receiver rotor.

Referring again to FIG. 1, an auxiliary sensing coil 40 is placed on the rotor of the receiver, and oriented to sense the stator quadrature field. Signals derived from the sensing coil on lines 41, 42 are applied to an amplifier 45. The amplified output, appearing at terminals 47, 48 is applied to a quadrature axis coil 50, wound, for example, on the rotor 23 to induce by transformer action an addition current in the stator quadrature axis. Thus for a certain shaft deflection, the developed torque will be amplified.

When the synchro is at the null position, the quadrature axis stator magnetomotive force, $I_{qs}$, will be equal to zero. Upon deflection of coil 13a away from zero, the quadrature axis stator magnetomotive force will be:

$$I_{qs} \alpha I_{qso} \times \phi \qquad (2)$$

where $I_{qso}$ is a constant induced current, and $\phi$ is the shaft misalignment angle. The developed torque, absent any amplification in amplifier 45, will then be $$T = K \times I_{dr} \times I_{qso} \times \phi \times \cos \phi \qquad (3)$$

By amplifying the quadrature axis current of the stator sensed by coil 40 and applying this current to a quadrature axis rotor coil 50 the developed torque will be amplified. Since the amplifier can be tuned such that the input signal is in phase with the rotor direct axis current, the cos $\theta$ term will be equal to one. Thus if the voltage gradient of the quadrature axis pickup coil is the same as for the rotor direct axis coil, the relationship of (3) above will then be $$T = K \times I_{dr} \times I_{qso} \times \phi \times A \qquad (4)$$

Comparison of relationships (3) and (4) above indicates that an item greater than 1, that is the gain A of the amplifier 45, has been added, and an item which may be less than 1 (the cosine of the phase angle between the rotor direct axis magnetomotive force) has been removed. This enables output at substantially greater torque than that available from a standard torque receiver. Depending on the gain of the amplifier (below limits of instability) an increase in output torque of from 10 to 100 can be obtained. The limiting increase will be the oscillation limit of the torque receiver, and the temperature rise or saturation level of the iron core structure.

Various ways may be followed to instrument the improved synchro of the present invention. Referring now to FIG. 2, the receiver R has a stator structure 25, wherein the stator windings are wound in the usual manner, only one such winding being shown in schematic form for clarity. The rotor is split into parts 26, 27, which are magnetically insulated from each other. Direct axis rotor winding 23 is wound over both members of the rotor stack, and may be skewed as is well known in the art. The pickup coil 40 is wound in the quadrature bar slots of the smaller rotor member 26 and the main quadrature axis winding 50 is wound on the quadrature bar slots of the larger rotor element 27, as schematically indicated in FIG. 2. These windings may, of course, be placed on top of winding 23, and the electrical connections brought out by suitable slip rings (not shown for clarity).

It has been found in actual tests, that somewhat higher accuracy that that obtained from a structure as shown in FIG. 2 can be obtained from a structure as shown in FIG. 3. A standard torque receiver synchro having a separately excited rotor 23 and stator coils 20, 21, 22, is coupled to a control transformer type synchro having stator coils 60, 61, 62 connected in parallel across terminals 30, 31, 32, respectively. The rotor coil 64a of a control transformer rotor 64 is aligned with the quadrature axis of the torque receiver to sense the quadrature axis field. The rotor 64 is mechanically connected to rotor 23 by a shaft 66. The terminals from the rotor coil 64a are brought out by slip rings (not shown) and applied to amplifier 45. The output of amplifier 45 is connected, as in the embodiment of FIG. 1 to a quadrature winding wound on the rotor 23 of the torque receiver synchro, and illustrated as winding 65 in FIG. 3. If desired, the synchros formed of stator coils 60, 61, 62, rotor 64 and rotor coil 64a and of stator coils 20, 21, 22, rotor 23 and rotor coils 23a and 65 may be mounted in the same housing together with amplifier 45. The power input terminals, schematically indicated by terminals 46, and omitted from FIG. 1, can be brought out directly to the common housing.

Placement of the coils 40, 50 (FIG. 1) and 65 (FIG. 3) in the proper slots, to provide for positioning in the quadrature axis, will be obvious to those skilled in the art.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A remote torque transmission system comprising, a synchro torque transmitter, said transmitter having three stator windings electrically displaced 120° and a rotor having a winding connected to a source of A-C potential,
a synchro torque receiver, said receiver having three stator windings electrically displaced 120°, each of said receiver stator windings being connected to a corresponding one of said transmitter stator windings and a rotor having a primary winding connected to a source of A-C potential and a secondary winding wound in quadrature to said primary winding, means magnetically coupled to said receiver stator windings for sensing a quadrature current, and means responsive to said sensed quadrature current to increase the magnitude of said quadrature current and to apply said increased quadrature current to said secondary winding whereby the torque capacity of said transmission system is substantially increased.

2. In a synchro of the type having a stator and a rotor wherein said stator is comprised of a plurality of windings and is connected with a source of reference signals and wherein a primary winding on said rotor is connected to a source of A-C potential and wherein the torque capacity of said synchro is proportional to a quadrature axis current induced in said stator winding from said rotor winding, the improvement which comprises, sensing means magnetically coupled to said stator and adapted to detect said quadrature current, amplifying means electrically connected to said sensing means to increase the magnitude of said quadrature current, and transformer means electrically connected to said amplifying means and adapted to apply said increased quadrature current to said stator whereby said torque capacity of said synchro is substantially increased.

3. The synchro as recited in claim 2 wherein said sensing means comprises a sensing winding.

4. The synchro as recited in claim 2 wherein said transformer means comprises a coil on said synchro rotor wound in quadrature to said primary winding.

5. The synchro as recited in claim 2 wherein said rotor is comprised of a main rotor stack and an auxiliary rotor stack each magnetically insulated from each other and said rotor winding is wound about said main rotor stack and said auxiliary rotor stack, said sensing means comprises a sensing winding wound on said auxiliary rotor stack in quadrature to said rotor winding, and said transformer means comprises a winding wound on said main rotor stack in quadrature to said rotor winding.

6. The synchro as recited in claim 2 wherein said sensing means comprises, a synchro transformer having a transformer stator with a plurality of windings coupled to said reference signal source and a transformer rotor mechanically connected to said synchro rotor and having a winding coupled to the input of said amplifying means and aligned in quadrature to said synchro rotor.

References Cited

UNITED STATES PATENTS

| 2,521,994 | 9/1950 | Politzer | 318—23.5 |
| 2,866,969 | 12/1958 | Takeuchi et al. | 318—24 XR |
| 3,366,859 | 1/1968 | Ludvigsen et al. | 318—24 XR |
| 3,381,191 | 4/1968 | Angus | 318—31 XR |

B. DOBECK, Primary Examiner

U.S. Cl. X.R.

318—23.5, 24